United States Patent
Tsunoda

(10) Patent No.: US 7,679,651 B2
(45) Date of Patent: Mar. 16, 2010

(54) IMAGE PICKUP APPARATUS, METHOD AND PROGRAM WITH COMPOSITE-IMAGE CREATING FUNCTION

(75) Inventor: Akihiro Tsunoda, Hino (JP)

(73) Assignee: Casio Computer Co., Ltd., Tokyo (JP)

( * ) Notice: Subject to any disclaimer, the term of this patent is extended or adjusted under 35 U.S.C. 154(b) by 970 days.

(21) Appl. No.: 10/930,216

(22) Filed: Aug. 31, 2004

(65) Prior Publication Data
US 2005/0052551 A1 Mar. 10, 2005

(30) Foreign Application Priority Data
Sep. 4, 2003 (JP) .............................. 2003-312524

(51) Int. Cl.
  *H04N 5/225* (2006.01)
  *H04N 5/262* (2006.01)
  *G06K 9/46* (2006.01)
  *G06K 9/36* (2006.01)

(52) U.S. Cl. .................... 348/218.1; 348/239; 382/190; 382/284

(58) Field of Classification Search ............... 348/231.6, 348/239, 218.1, 207.99
See application file for complete search history.

(56) References Cited

U.S. PATENT DOCUMENTS

| | | | | |
|---|---|---|---|---|
| 5,557,358 A * | 9/1996 | Mukai et al. | ................. | 396/296 |
| 5,857,855 A * | 1/1999 | Katayama | .................... | 434/247 |
| 6,028,583 A * | 2/2000 | Hamburg | .................... | 345/629 |
| 6,204,840 B1 * | 3/2001 | Petelycky et al. | ......... | 715/500.1 |
| 6,268,890 B1 * | 7/2001 | Kawahara | .................... | 348/739 |
| 6,514,081 B1 * | 2/2003 | Mengoli | ..................... | 434/252 |
| 6,560,399 B2 * | 5/2003 | Sato et al. | ...................... | 386/1 |
| 7,214,138 B1 * | 5/2007 | Stivers et al. | ............... | 473/199 |

FOREIGN PATENT DOCUMENTS

| | | | |
|---|---|---|---|
| JP | 05-224285 A | | 9/1993 |
| JP | 11-205666 A | | 7/1999 |
| JP | 11-331693 A | | 11/1999 |
| JP | 11331693 | * | 11/1999 |
| JP | 2000-232609 A | | 8/2000 |
| JP | 2001-028726 A | | 1/2001 |
| JP | 2001028726 | * | 1/2001 |
| JP | 2001-036858 A | | 2/2001 |
| JP | 2003-069888 A | | 3/2003 |
| JP | 2003069888 | * | 3/2003 |

* cited by examiner

*Primary Examiner*—Sinh Tran
*Assistant Examiner*—Christopher K Peterson
(74) *Attorney, Agent, or Firm*—Frishauf, Holtz, Goodman & Chick, P.C.

(57) ABSTRACT

An image pickup apparatus capable of creating various composite images easily, and also obtaining composite images such as would be obtained at different shutter speeds even after the frame images were picked up. Successive frame images of an object are picked up in a successive image-pickup mode at predetermined time intervals. The predetermined number of frame images obtained are then stored in time series in a buffer memory. Pointers indicating composition start and end positions slidable on a bar of a range selector specify therebetween a composition range in which some successive ones of the predetermined number of frame images fall on a composing picture. The respective frame images falling in the specified range are read from the buffer memory and processed, thereby producing a composite image. In this case, by changing the composition range with the range selector, a composite image such as would be obtained at a different shutter speed is displayed on a composite result display picture.

10 Claims, 11 Drawing Sheets

COMPOSITE IMAGE

IMAGE PICKUP APPARATUS, METHOD AND PROGRAM WITH COMPOSITE-IMAGE CREATING FUNCTION

BACKGROUND OF THE INVENTION

The present invention relates to image pickup apparatus such as, for example, digital cameras and more particularly to image pickup apparatus, methods and programs with a function to create a composite image from a plurality of frame images.

Some prior-art image pickup apparatus such as digital cameras have a composite-image creating function. For example, Published Unexamined Japanese Patent Application 11-205666 discloses picking up images of objects near and far such as a person (as a central object) and a landscape present behind the person (as a background object) by setting strobe-light emission quantities optimal to the respective objects, extracting optimal-brightness image portions from the respective images, and then combining them into a composite image.

Published Unexamined Japanese Patent Application 5-224285 discloses a multi-image pickup technique for creating such a composite image in which the position of an image of an object picked up previously is indicated specifically within a finder, thereby preventing superimposition of an image of an object to be picked up next on the image of the object picked up previously.

The above prior-art image pickup apparatus, however, simply creates a composite image by combining a predetermined number of (usually, two) images respectively picked up, and cannot create various composite images in such a manner that each composite image is obtained by combining any number of successive ones selected from a plurality of frame images successively picked up.

A prior-art image pickup apparatus of this type is capable of adjusting the shutter speed to any desired value for pickup purposes. However, once a shutter speed is determined, images such as would be obtained at various shutter speeds cannot be obtained.

It is therefore an object of the present invention to provide an image pick up apparatus, image processing method and program capable of creating various composite images easily using a plurality of images obtained in the successive image pickup, and also creating various images such as would be obtained at different shutter speeds even after the image pickup has been completed.

SUMMARY OF THE INVENTION

In one aspect, the present invention provides an image pickup apparatus comprising:

an image pickup unit that picks up successive frame images of an object at predetermined time intervals;

a storage device that stores in time series a predetermined number of successive ones of the frame images picked up by the image pickup unit;

a composition range specifying unit that specifies a composition start position and a composition end position on the predetermined number of successive image frames to thereby delimit a composition range in which successive ones of the predetermined number of successive image frames fall;

a combining unit that reads from the storage device the respective successive frame images falling in the delimited range, and combines these read frame images into a composite image;

a display unit that displays the composite image; and a control unit, responsive to an enter command, for recording the composite image displayed on the display unit in a predetermined memory.

According to this image pickup apparatus, any composite image can be easily created by specifying the range in which any particular number of successive frame images fall among the respective frame images obtained in successive pickup. The composite image can be visually confirmed on the display screen and recorded in a memory as required. If the number of frame images to be combined is changed (that is, if the composition range between the composition start and end positions is changed), a composite image such as would be obtained at a different shutter speed can be obtained even after the image pickup was performed.

In another aspect, the present invention provides an image pickup apparatus comprising:

an image pickup unit that picks up successive frame images of an object at predetermined time intervals;

a storage device that stores in time series a predetermined number of successive ones of the frame images picked up by the image pickup unit;

a composition range specifying unit that specifies a composition start position and a composition end position on the predetermined number of successive image frames to thereby delimit a composition range in which successive ones of the predetermined number of successive image frames fall;

an image part specifying unit that specifies any particular corresponding parts of the successive frame image falling in the delimited composition range;

a combining unit that reads from the storage device the respective successive frame images falling in the delimited composition range and combines these read frame images with respect to only the specified particular parts, thereby producing a composite image;

a display unit that displays the composite image; and a control unit, responsive to an enter command, for recording the composite image displayed on the display unit in a predetermined memory.

According to such image pickup apparatus, a composition range is specified in which any particular number of successive ones selected among the respective frame images obtained in the successive pickup fall, any particular corresponding parts of the selected particular number of frame images are specified, and the selected particular number of frame images are combined with respect to only the specified parts of the selected particular number of frame images. Thus, any desired composite image can be easily created. In addition, while confirming the composite image on a display unit, it can be recorded in a memory as required. If the number of frame images to be combined is changed (that is, if the composite range between the composition start and end positions is changed), a composite image with an image part such as would be obtained at a different shutter speed is obtained due to the image parts being specified even after the image pickup was performed.

In still another aspect, in the image pickup apparatus the composition range specifying unit may comprise a range selector having a bar with a length capable of specifying the predetermined number of successive image frames on the bar on a time base and specifying the composition start and end positions on the slide bar.

According to such arrangement, the composite range between the composition start and end positions can be easily specified with the range selector.

In a further aspect, the image pickup apparatus further may comprise:

a selecting unit that selects one of a plurality of composition methods; and wherein:

the combining unit combines the read successive frame images into the composite image in the composition method selected by the selecting unit.

According to such arrangement, various composite images can be created by using the respective different composition methods, which include methods "Add", "Average", "Maximum" and "Minimum". The method "Add" comprises obtaining a plurality of luminance signals, each representing luminance of a respective one of q (rows)×q (columns) pixels of a prospective composite image and produced by adding luminance signals representing respective luminance of p pixels of the p read frame images which correspond in row and column to that pixel of the prospective composite image and then producing a composite image by using the obtained plurality of luminance signals for respective pixels of the composite image. The method "Average" comprises obtaining a plurality of luminance signals, each representing luminance of a respective one of q (rows)×q (columns) pixels of a prospective composite image and produced by averaging luminance signals representing respective luminance of p pixels of the p read frame images which correspond in row and column to that pixel of the prospective composite image, and then producing a composite image by using the obtained plurality of luminance signals for respective pixels of the composite image.

The method "Maximum" comprises obtaining a plurality of luminance signals, each representing luminance of a respective one of q (rows)×q (columns) pixels of a prospective composite image and comprising a luminance signal representing maximum luminance selected by comparison from luminance signals of p pixels of the p read frame images which correspond in row and column to that pixel of the prospective composite image and then producing a composite image by using the obtained plurality of luminance signals for respective pixels of the composite image. The method "Minimum" comprises obtaining a plurality of luminance signals, each representing luminance of a respective one of q (rows)×q (columns) pixels of a prospective composite image and comprising a luminance signal representing minimum luminance selected by comparison from luminance signals of p pixels of the p read frame images which correspond in row and column to that pixel of the prospective composite image and then producing a composite image by using the obtained plurality of luminance signals for respective pixels of the composite image.

In a still further aspect, the image pickup apparatus may further comprise a successive image-pickup time interval setting unit that sets any particular time interval at which the image pickup unit picks up frame images successively.

According to such arrangement, by changing the time interval of successive image pickup, the successive image pickup can be performed. For example, if the time interval is set to a small value, the number of frame images to be picked up in a unit time is increased, thereby providing a high density composite image.

According to the present invention, various composite images can be easily created using the plurality of images successively picked up. While visually confirming the various composite images displayed on the display screen, the user can efficiently store only required composite images in a memory.

By changing the number of frame images to be combined, a composite image such as would be obtained at a different shutter speed is obtained even after the image pickup is performed.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

FIRST EMBODIMENT

Figure 1A:
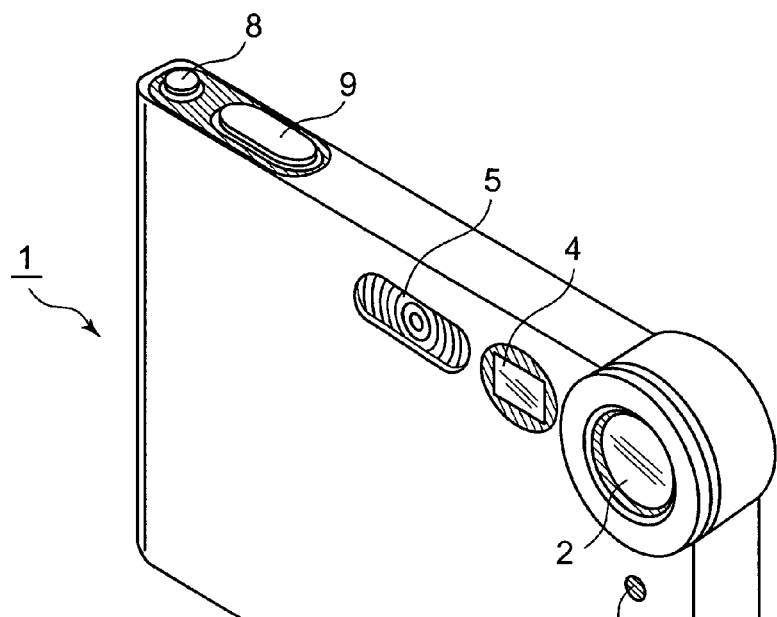
FIGS. 1A and 1B are perspective views, respectively, of a digital camera as an image pickup apparatus in a first embodiment of the present invention, as viewed obliquely from before and behind, respectively.
Figure 1B:
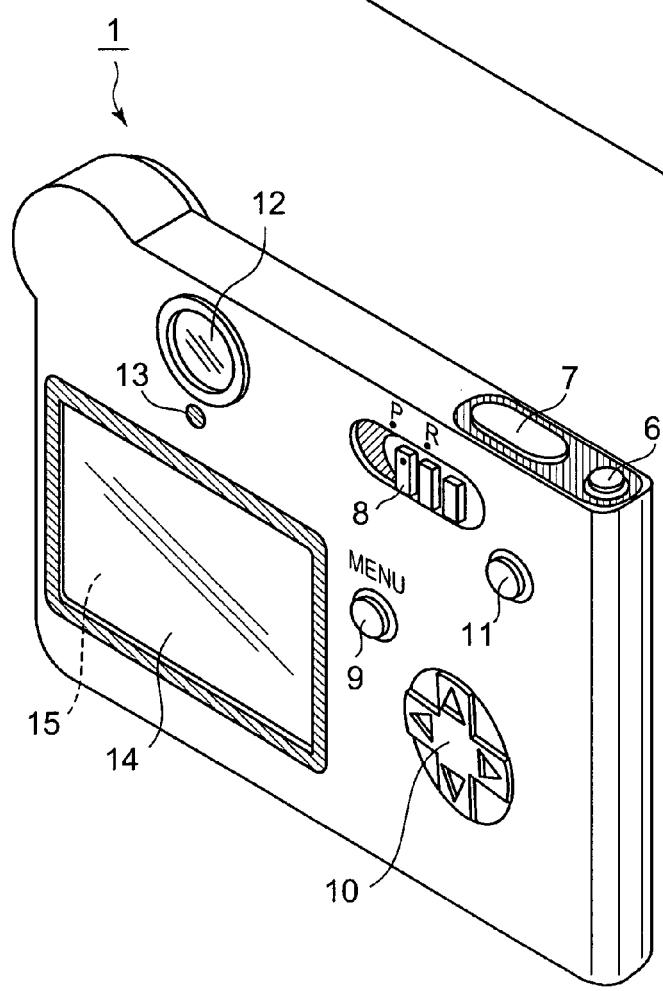

FIGS. 1A and 1B are perspective views of a digital camera typical of an image pickup apparatus as a first embodiment of the present invention, as viewed obliquely from before and behind, respectively.

The digital camera 1 has a rectangular plate-like body that has on its front an image pickup lens 2, a self timer lamp 3, an optical finder window 4, and a strobe light emitter 5. The camera 1 also has a power supply key 6 and a shutter key 7 on its top near a left side thereof. The power supply key 6 is used to turn on/off the power supply. The shutter key 7 is used to inform the camera in an image-pickup mode that an image-pickup timing has come.

The digital camera 1 also has on its back a mode switch 8, a menu key 9, a cross key unit 10, a successive image-pickup key 11, an optical finder 12, a strobe charge lamp 13 and a display unit 14.

The mode switch 8 includes, for example, a slide key switch that switches between a record mode "R" and a playback mode "P" as basic modes. The menu key 9 is used to select any one of various menu items. The cross key unit 10 comprises four keys that are used to move a cursor upward, downward, rightward, and leftward, thereby moving a displayed menu item etc. The successive image-pickup key 11 is used to specify a successive image-pickup mode in which frame images of an object are successively picked up at predetermined time intervals.

The strobe charge lamp 13 comprises an LED lamp disposed below the optical finder 12 to allow the user to view a charged state of the strobe even when the user views the optical finder 12 or the display unit 14.

The display unit 14 comprises, for example, a color liquid crystal panel with a backlight. It displays a through image as the electronic finder in the record mode for monitoring purposes while playing back a selected image in the playback mode. Disposed on a display screen of the display unit 14 is a pointing device as a touch panel 15 to allow the user to select a menu item or specify a range with a pen.

Provided on a bottom of the camera 1 (not shown) are a memory card slot into which a memory card as a recording medium can be inserted, a serial interface connector comprising, for example a USB (Universal Serial Bus) connector, for connection to an external personal computer or the like.

Figure 2:
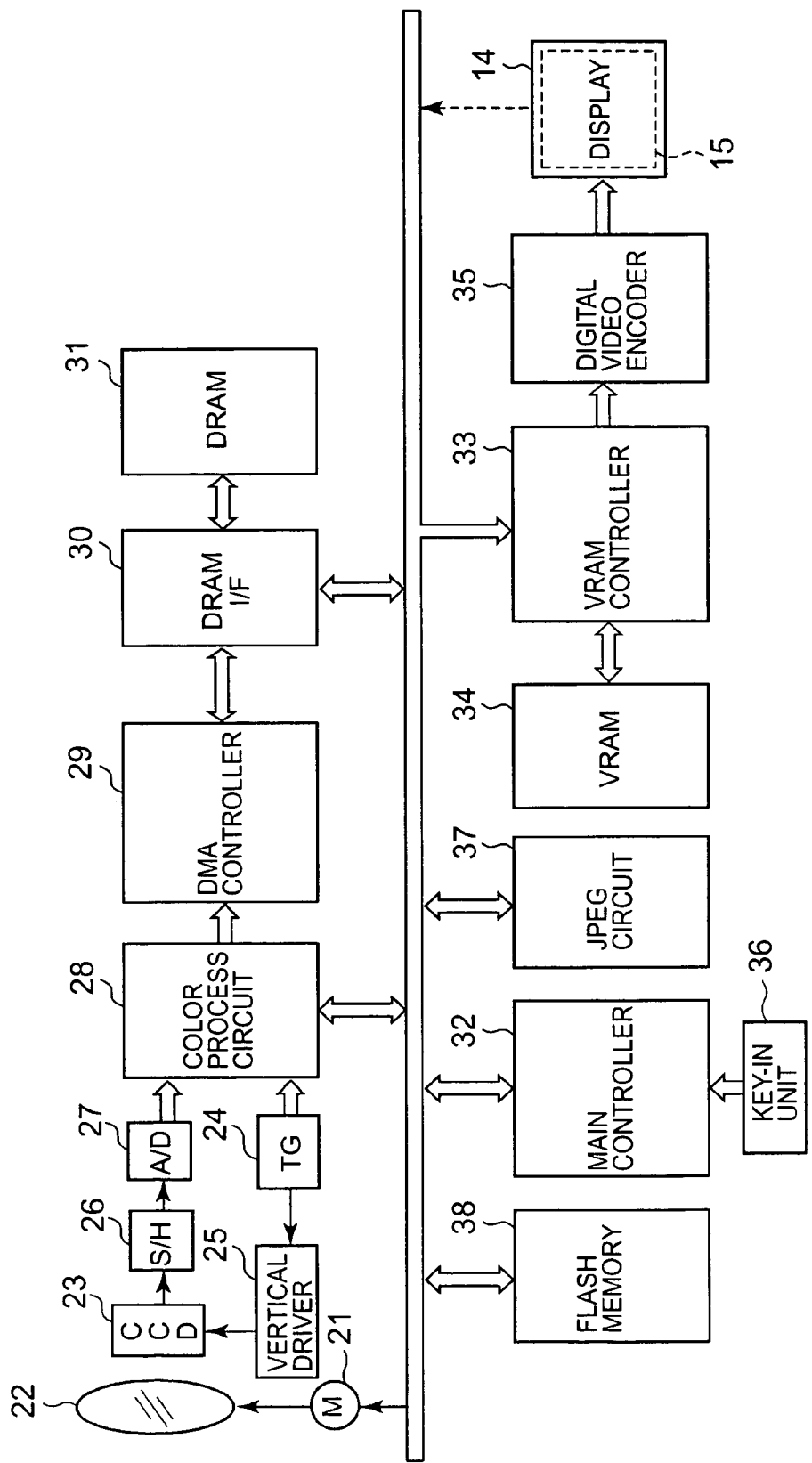
FIG. 2 is a block diagram of an electronic circuit of the digital camera.

FIG. 2 is a block diagram of an electronic circuit of the camera 1. In FIG. 2, when a motor (M) 21 is driven in the record mode as the basic mode, a focus/iris position of a lens optical system 22 composing the image pickup lens 2 is moved. An image pickup device of a CCD 23 is disposed after the lens optical system 22 on the optical axis. The CCD 23 is driven via a vertical driver 25 by a timing generator (TG) 24, thereby outputting cyclically an optoelectronic conversion signal corresponding to a focused optical image.

The outputted optoelectronic conversion signal comprises three primary-color R, G and B component signals, which are appropriately adjusted respectively in gain, sampled and held by a sample and hold circuit 26, and converted by an A/D converter 27 to digital R, G and B component data. These data are then subjected to color processing including pixel interpolation and extrapolation processes and an γ-correcting process in a color process circuit 28, thereby producing a digital luminance signal Y and digital color difference signals Cb and Cr. These signals are then outputted to a DMA (Direct Memory Access) controller 29.

The DMA controller 29 temporarily writes the luminance signal Y and the color difference signals Cb and Cr outputted from the color process circuit 28 to an internal buffer of the DMA controller 29, using a complex sync signal, a memory write enable signal and a clock signal from the color process circuit 28, and then DMA transfers the written signals via a DRAM interface (I/F) 30 to a DRAM 31 used as a buffer memory.

After the DMA transfer of the luminance signal and the color difference signals to the DRAM 31, the main controller 32 that is the main control circuit of the camera 1 reads the luminance signal and the color difference signals from the DRAM 31 via the DRAM interface 30, and then writes these signals via the VRAM controller 33 to the VRAM 34.

A digital video encoder 35 periodically reads a luminance signal and color difference signals from the VRAM 34 via the VRAM controller 33, produces a video signal based on these read signals, and delivers the video signal to the display unit 14.

The display unit 14 functions as the monitor display (or electronic finder) in the record mode. It performs a display operation based on a video signal from the digital video encoder 35, and at that time displays in real time a picture based on picture information received from the VRAM controller 33.

When a touch panel 15 is disposed on the display unit 14, a position on the display screen specified with the pen is sensed and information on the coordinates of that position is inputted to the main controller 32.

When the shutter key 7 of the key-in unit 36 is operated at a desired timing of picking up a still image when the image is displayed in real time as a monitored image on the display unit 14, a trigger signal is generated. In response to this trigger signal, the controller 32 DMA transfers to the DRAM 31a luminance signal and color difference signals for one picture received already from the CCD 23 at that time, and immediately stops the route from the CCD 23 to the DRAM 31, thereby shifting to a record storage state.

In this record storage state, the controller 32 reads luminance signals Y and color difference signals Cb and Cr for one frame image from the DRAM 31 for the Y, Cb and Cr components in units of a basic block of 8 (rows)×8 (columns) pixels via the DRAM interface 30 and writes the read signals to a JPEG (Joint Photograph coding Experts Group) circuit 37, which then compresses the data by ADCT (Adaptive Discrete Cosine Transform), and Huffman coding which is an entropy encoding system. Resulting code data is then read out as a one-image data file from the JPEG circuit 37 and written to a flash memory 38 set removably as a recording medium on the digital camera 1.

After compressing the luminance and color difference signals for one frame and writing the compressed data to the flash memory 38, the main controller 32 re-starts up the route from the CCD 23 to the DRAM 31.

In addition to the shutter key 7, the key-in unit 36 comprises the power supply key 6, mode switch 8, menu key 9, cross key unit 10 and successive image-pickup key 11, mentioned above. Signals from these keys are sent directly to the controller 32. When the successive image-pickup key 11 is operated, the controller 32 performs successive image pickup at intervals of time, Δt, and sequentially writes a predetermined number of (n) still frame images to the flash memory 38.

In the pickup of a moving image and not a still image, the controller 32 successively records files of still frame-image data compressed by the JPEG circuit 37 on the flash memory 38 during the time when the shutter key 7 continues to be depressed. When the depression of the shutter key 7 is terminated or a predetermined limited time, for example of 30 seconds, has elapsed, the main controller 32 re-sets the series of still frame image data files collectively as a motion JPEG data file.

In the playback mode, the main controller 32 selectively reads image data recorded in the flash memory 38, expands the image data compressed in the JPEG circuit 37, stores the expanded data in the DRAM 31 via the DRAM interface 30, and then stores the data stored in the DRAM 31 via the VRAM controller 33 in the VRAM 34. The main controller 32 reads image data periodically from the VRAM 34, thereby producing a corresponding video signal, which is then replayed on the display unit 14.

When the selected image data does not relate to a still image, but a moving image, the main controller 32 timewise successively replays the respective still image data composing the selected moving-image file. When the main controller 32 has completed the replay of all the still image data, it replays and displays only head still image data until a next replay command is given.

Figure 3:
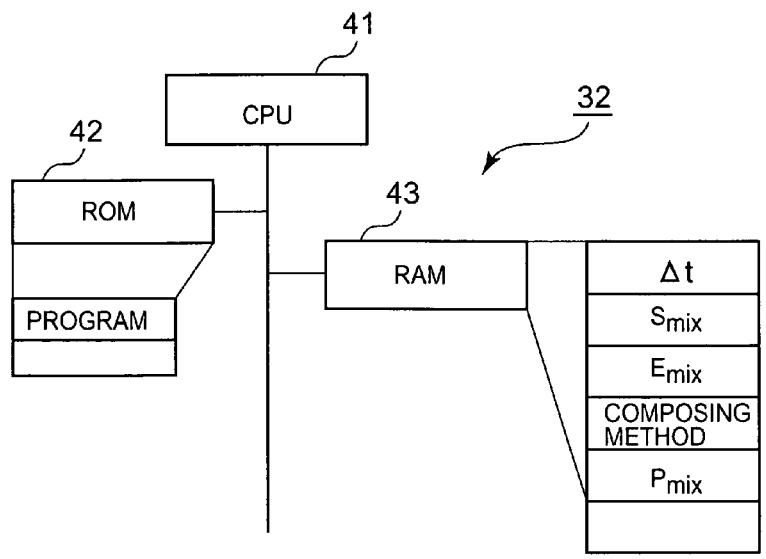
FIG. 3 is a block diagram of a controller provided as a main control circuit in the digital camera.

FIG. 3 is a block diagram of the main controller 32 that comprises a microcomputer that in turn comprises a CPU 41, a ROM 42 and a RAM 43. The CPU 41 is in charge of control of the whole digital camera 1, and reads a program, thereby performing various processes in accordance with the program. The ROM 42 has stored programs to be performed by the CPU 41.

The RAM 43 is used as a working memory that stores composition information (FIG. 7) such as a successive image-pickup time interval, Δt (FIG. 4), a composition start position Smix, a composition end position Emix, a composition method ("Add"/"Average"/"Maximum"/"Minimum"), and a specified image part or area Pmix (FIG. 11) to be used in a second embodiment to be described later.

A method of creating a composite image according to the invention will be described next.

Figure 4:
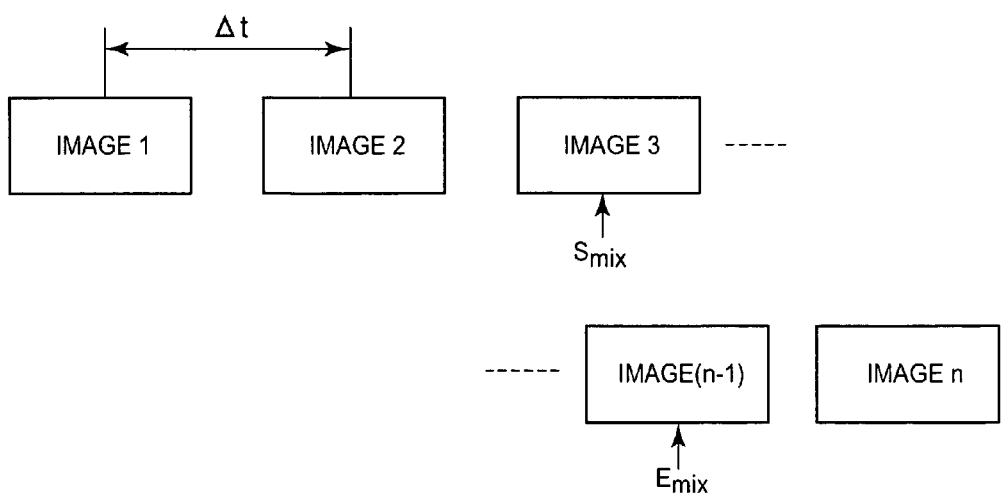
FIG. 4 schematically illustrates various images obtained in time series in a successive image-pickup mode of the digital camera.
Figure 5:
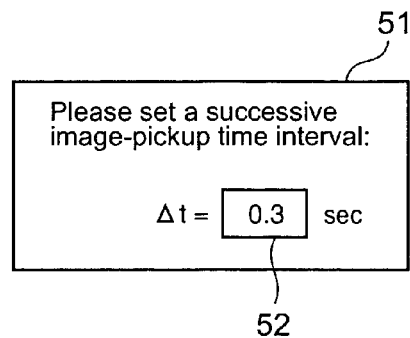
FIG. 5 illustrates one example of a picture on which an image pickup time interval is set in the successive image-pickup mode of the digital camera.
Figure 6:
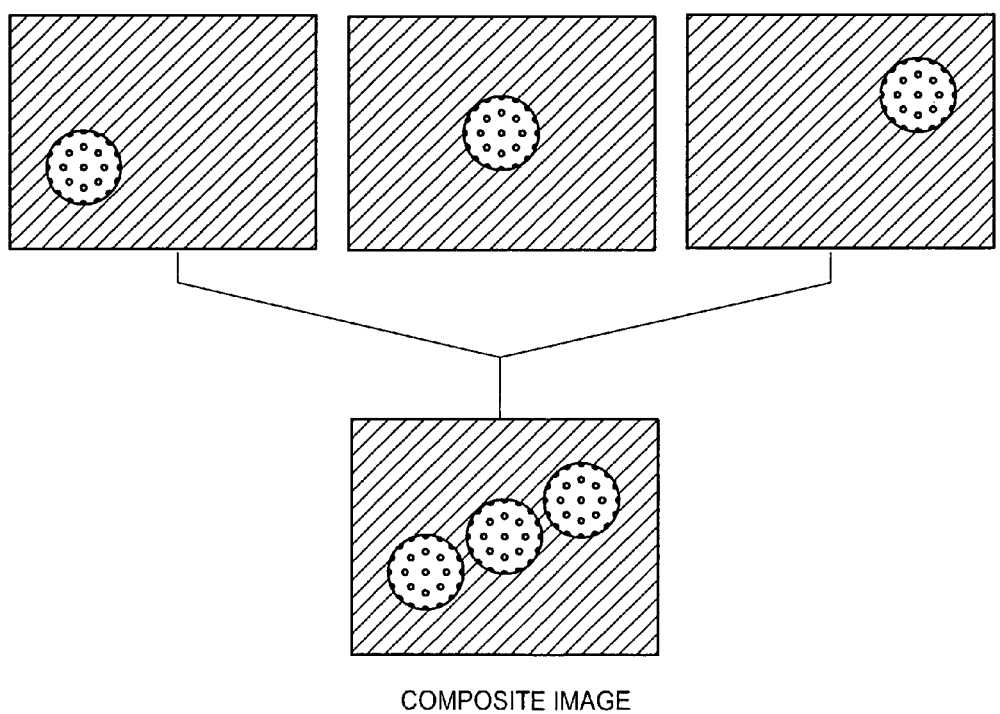
FIG. 6 illustrates one example of a picture obtained as a result of image composition in the digital camera.

FIG. 4 schematically illustrates respective frame images obtained in a time series in a successive image-pickup mode of the digital camera 1. FIG. 5 schematically illustrates one example of a picture 51 on which an image-pickup time interval is set in the successive image-pickup mode. FIG. 6 illustrates one example of a composite image obtained as a result of composition.

As described above, the digital camera 1 has the successive image-pickup mode which will be started up by depressing the successive image-pickup key 11. A predetermined number of (n) frame images of an object are obtained in the successive image-pickup mode, as shown in FIG. 4. Now, let the successive image-pickup time interval be $\Delta t$. Then, n successive frame images in which the time interval between adjacent frame images is $\Delta t$ are obtained.

In order to produce a composite image from any particular number of ones selected from these n successive frame images, a range in which the selected particular number of frame images fall is delimited by composition start and end positions Smix and Emix specified with a range selector to be described in more detail later. In the example of FIG. 4, a third frame image "image 3" and a $(n-1)^{th}$ frame image "image $(n-1)$" are specified as the composition start and end positions Smix and Emix, respectively, and the "image 3" through "image $(n-1)$" are used for composing purposes.

The successive image-pickup time interval, $\Delta t$, can be changed to any value by the user on the successive image-pickup interval setting picture 51, for example, as shown in FIG. 5. This picture 51 has a time input part 52 that is arranged such that any time interval can be set on that part by operating, for example, up and down keys of the cross key unit 10. In the example of FIG. 5, $\Delta t$="0.3" seconds is illustrated as being set, which means that frame images are picked up at time intervals of 0.3 seconds in successive image pickup.

If in this case frame images of a moving image are successively picked up at increased time intervals, $\Delta t$, a composite image of discreet frame images of the moving object such as shown in FIG. 6 would be obtained. If $\Delta t$ is reduced towards zero, the number of frame images per unit time increases. Thus, the density of a resulting composite image increases and the frame images of the moving object appear to be continuously connected, which is equivalent to the shutter speed being continuously changed.

Figure 7:
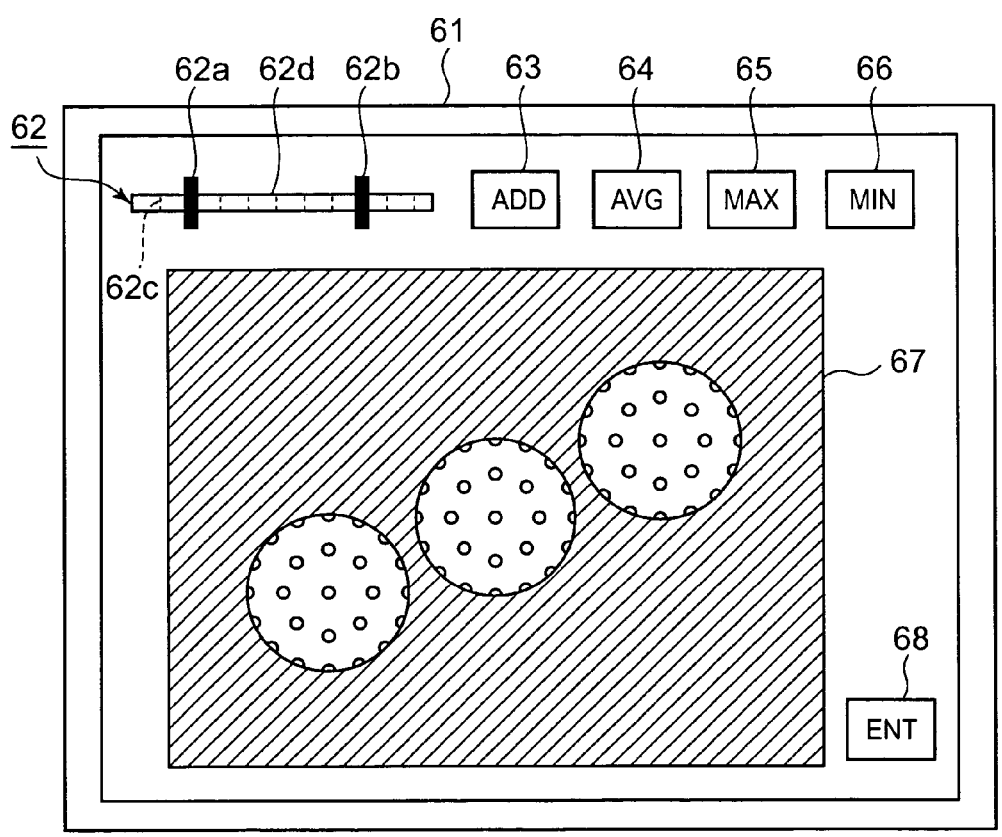
FIG. 7 illustrates the composition of a composing picture on the digital camera.

FIG. 7 illustrates the structure of a composing picture that is used when the user produces a composite image. When n frame images are obtained in the successive image-pickup mode, a composite picture 61 such as shown in FIG. 7 is displayed on the display unit 14. The composing picture 61 comprises the range selector 62 that specifies a composition range, MIX buttons 63-66 that select a composite image composition method, a composition result display part 67 that displays a result of the composition, and an enter button 68 that gives an enter command.

The range selector 62 is used to specify or delimit a desired range of n frame images, which are to be combined, with pointers 62a and 62b slidable on a bar 62d thereof that represent desired composition start and end positions, respectively. The pointers 62a and 62b are slid on the bar 62d, for example, with right and left keys, respectively, of the cross key unit 10. The bar 62d has scales 62c marked at equal intervals thereon in which each interval corresponds to one frame image.

Alternatively, the range selector 62 may be one that specifies a time span in place of the number of image frames. In this case, the scales 62c are marked at predetermined equal time intervals. For composing purposes, the user will specify images falling in a time range of a specified $m^{th}$ second to a specified $n^{th}$ second with the pointers 62a and 62b while viewing the scales.

In this embodiment, a plurality of composition methods "Add", "Average", "Maximum" and "Minimum" are prepared which can be selected with the MIX buttons 63-66, respectively. These MIX buttons 63-66 and the enter button 68 may be operated, for example, by the cross key unit 10 or a pen for use with the touch panel 15.

The method "Add" comprises obtaining a plurality of luminance signals, each representing luminance of a respective one of q (rows)×r (columns) pixels of a prospective composite image and produced by adding luminance signals representing respective luminance of p pixels of the p read frame images which correspond in row and column to that pixel of the prospective composite image and then producing a composite image by using the obtained plurality of luminance signals for respective pixels of the composite image. The method "Average" comprises obtaining a plurality of luminance signals, each representing luminance of a respective one of q (rows)×r (columns) pixels of a prospective composite image and produced by averaging luminance signals representing respective luminance of p pixels of the p read frame images which correspond in row and column to that pixel of the prospective composite image, and then producing a composite image by using the obtained plurality of luminance signals for respective pixels of the composite image. The method "Maximum" comprises obtaining a plurality of luminance signals, each representing luminance of a respective one of q (rows)×r (columns) pixels of a prospective composite image and comprising a luminance signal representing maximum luminance selected by comparison from luminance signals of p pixels of the p read frame images which correspond in row and column to that pixel of the prospective composite image and then producing a composite image by using the obtained plurality of luminance signals for respective pixels of the composite image. The method "Minimum" comprises obtaining a plurality of luminance signals, each representing luminance of a respective one of q (rows)×r (columns) pixels of a prospective composite image and comprising a luminance signal representing minimum luminance selected by comparison from luminance signals of p pixels of the p read frame images which correspond in row and column to that pixel of the prospective composite image and then producing a composite image by using the obtained plurality of luminance signals for respective pixels of the composite image.

The composite image thus produced is displayed on the composition result display part 67. If this composite image is satisfactory, the enter button 68 can be pressed, thereby recording the composite image in an image recording memory (herein, a flash memory 38). No recording is performed unless the enter button 68 is depressed. Thus, various composite images can be produced and visually confirmed on the composition result display part 67 by operating the range selector 62 and the MIX buttons 63-66.

Then, operation of the first embodiment of the image pickup apparatus (or digital camera) of this invention will be described next.

Figure 8:
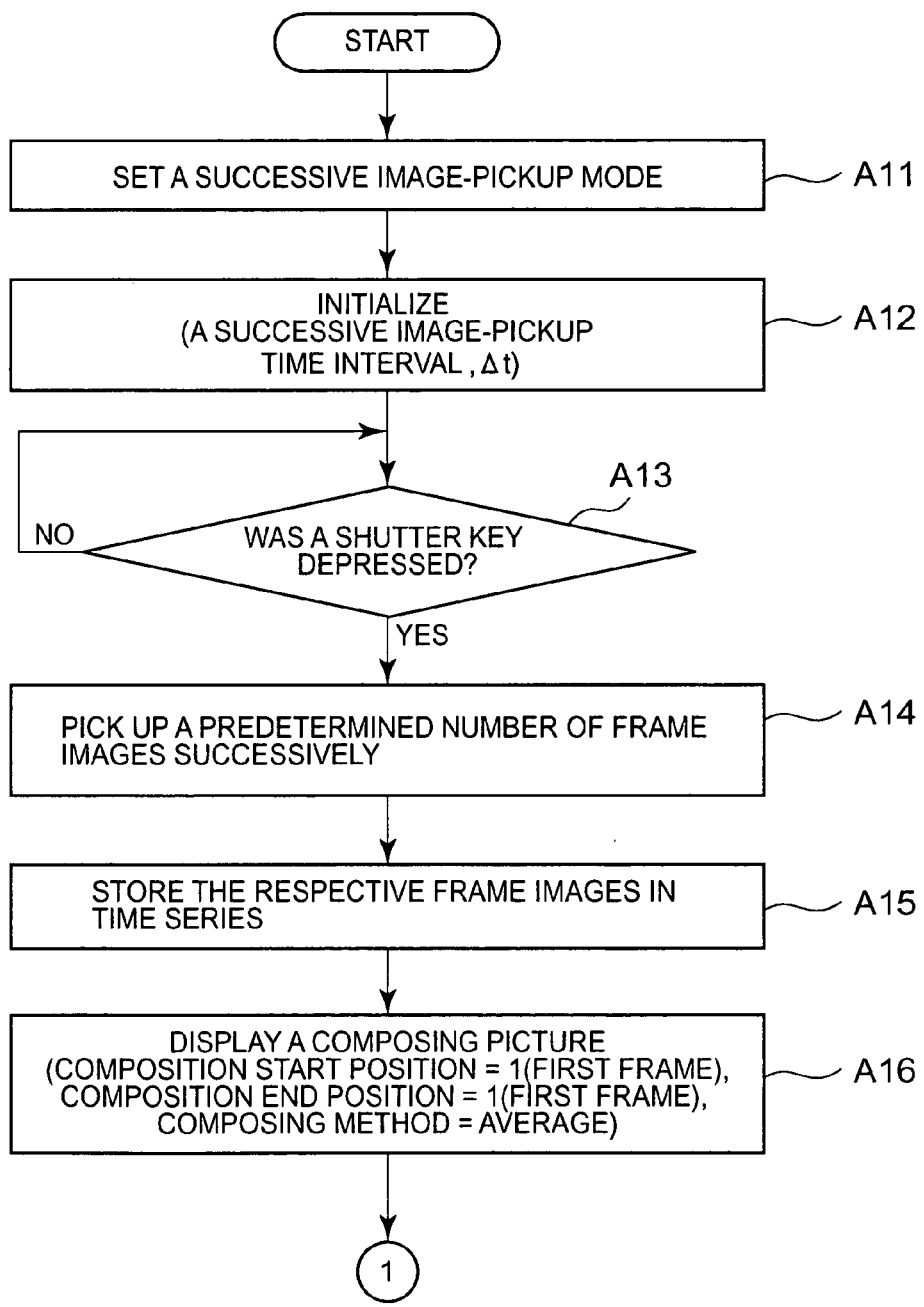
FIG. 8 is a flowchart indicative of processing of the digital camera.
Figure 9:
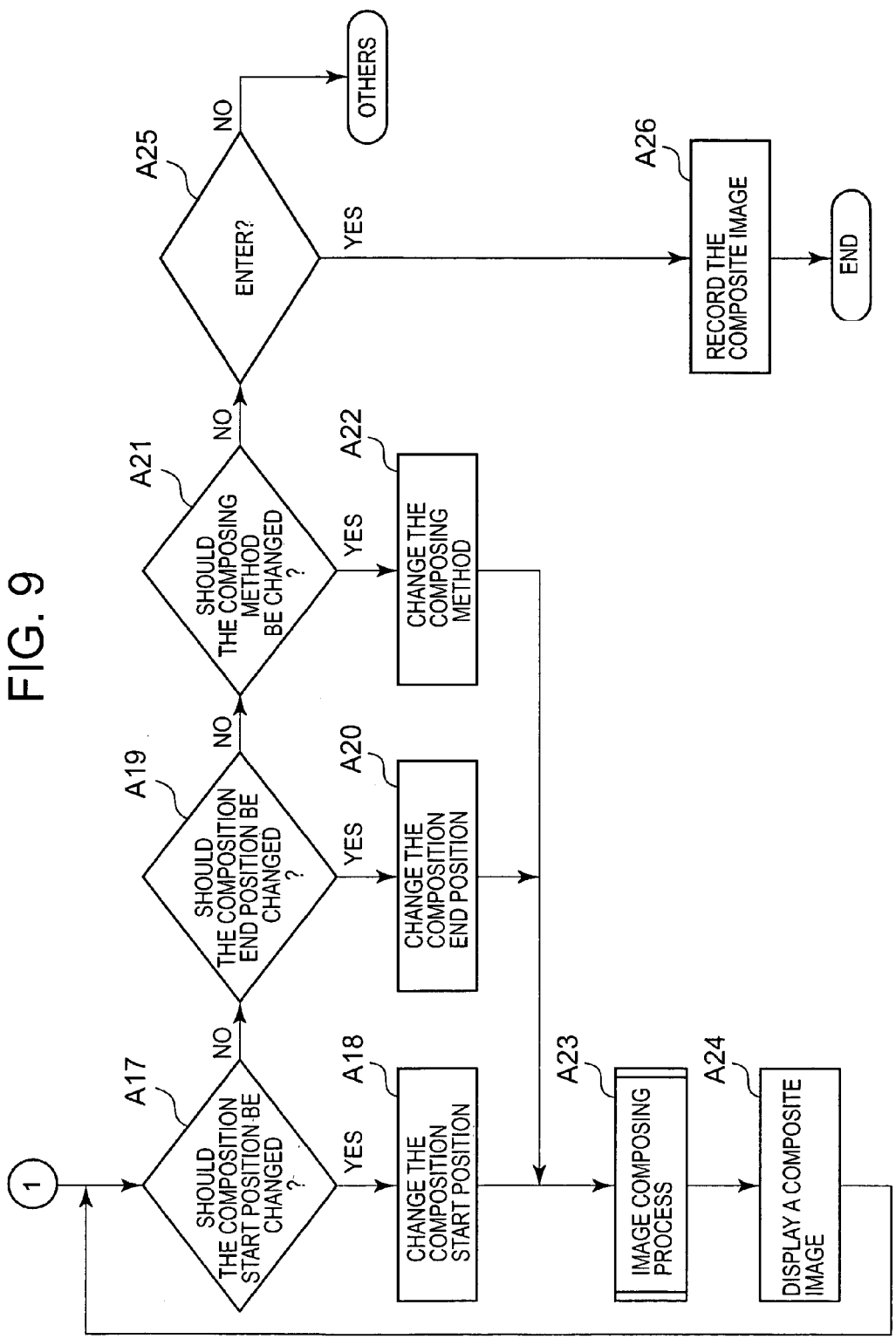
FIG. 9 is a flowchart continued to that of FIG. 8.

FIGS. 8 and 9 cooperate to indicate a flowchart indicative of operation of the digital camera 1 of the first embodiment.

The respective processes shown by the flowchart are performed by the CPU 41, which composes the main controller 32, in accordance with programs stored in the ROM 42.

First, when the user depresses the successive image pickup key 11, thereby setting the successive image-pickup mode in a state in which the mode switch 8 is in a record mode "R" (or image pickup mode) (step A11), the CPU 41 initially displays a successive image-pickup interval setting picture 51 on the display unit 14, as shown in FIG. 5 (step A12). As described above, any successive image-pickup time interval, Δt, can be set on the successive image-pickup interval setting picture 51 and stored in a predetermined area of the RAM 43 of FIG. 3.

When the shutter key 7 is depressed (Yes in step A13), the CPU 41 performs a successive image-pickup operation at the set time intervals, Δt, thereby obtaining a predetermined number of (n) frame images (step A14). Since the image pickup in the record mode has been already described with reference to FIG. 2, further description thereof will be omitted herein. The n frame images obtained in this successive image-pickup mode are temporarily stored in time series in a predetermined area of the DRAM 31 as a buffer memory (step A15).

Then, the CPU 41 displays on the display unit 14 a composing picture 61 such as shown in FIG. 7 and waits for the user's command to be given next (step A16). In an initial state, each of the composition start and end positions Smix and Emix is set, for example, in a first frame image, and the composition method set is the "Average" in this example.

When the user moves the pointer 62a on the bar 62d on this composing picture 61 to any specified position, this position determines a composition start position Smix (step A17, A18). Likewise, when the pointer 62b is moved on the bar 62d to any specified position, this position determines a composition end position Emix (step A19, A20). When any one of the MIX buttons 63-66 is selected, a composition method is determined depending on the selected button (steps A21, A22).

In accordance with the user's composing operation, the CPU 41 combines the successive pictures specified by the range selector 62 in the composition method specified by the MIX buttons 63-66 (step A23).

Figure 10:
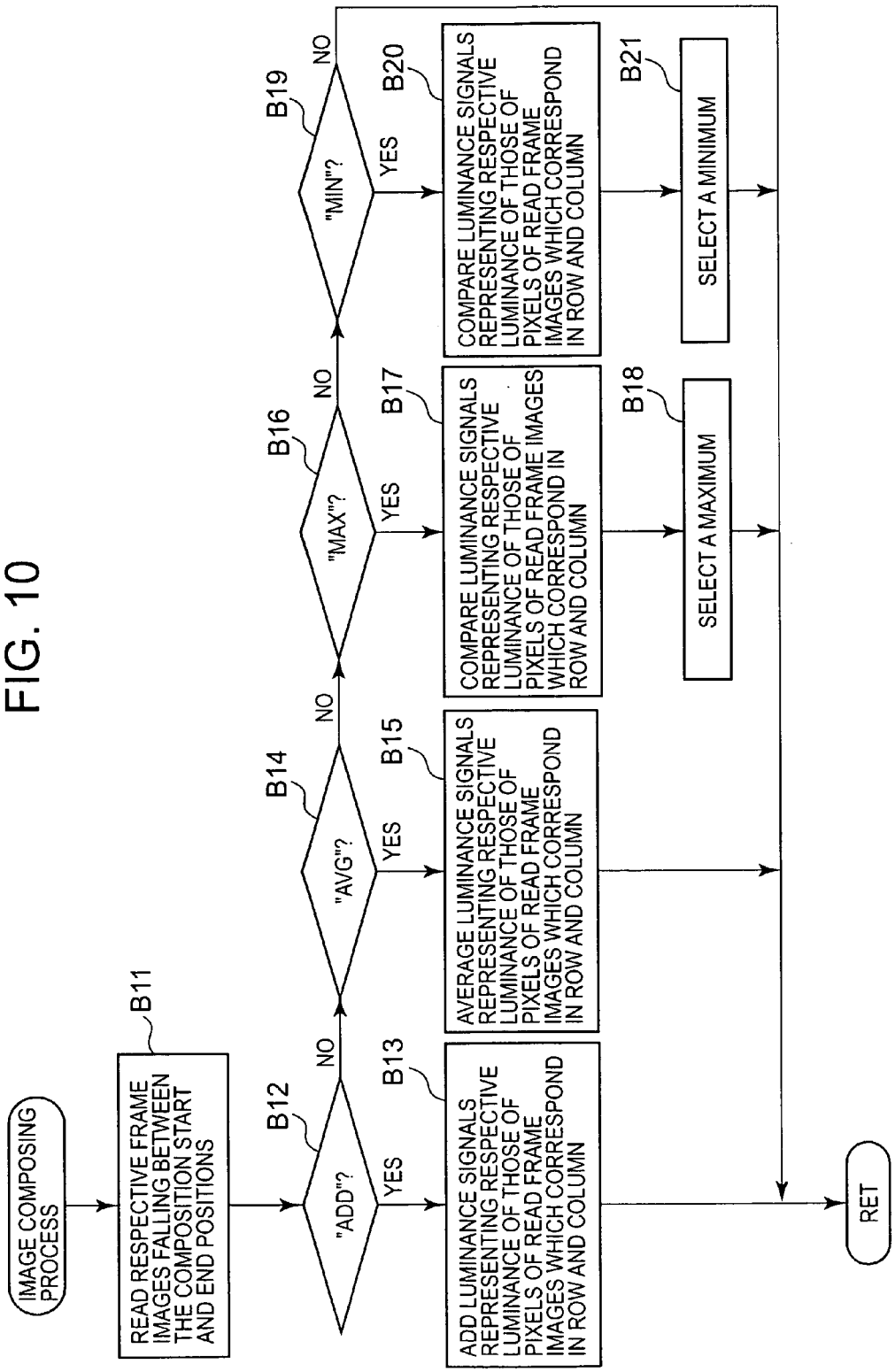
FIG. 10 is a flowchart indicative of an image composition process in the digital camera.

More particularly, as shown in the flowchart of FIG. 10, the CPU 41 first searches the n frame images stored in the DRAM 31 for frame images at the composition start and end positions Smix and Emix specified by the pointers 62a and 62b, respectively, on the bar 62d, and reads the frame images at the composition start and end positions Smix and Emix and the respective successive images present between the composition start and end positions Smix and Emix as being combined (step B11).

Then, the CUP 41 checks to see what the present set composition method is. If it is "Add" (Yes in step B12), the CPU 41 obtains a plurality of luminance signals, each representing luminance of a respective one of q (rows)×r (columns) pixels of a prospective composite image and produced by adding luminance signals representing respective luminance of p pixels of the p read frame images which correspond in row and column to that pixel of the prospective composite image and then producing a composite image by using the obtained plurality of luminance signals for respective pixels of the composite image, and develops the composite image on the VRAM 34 (step B13). Since in this case the luminance signals representing respective luminance of the pixels corresponding in row and column are added, the composite image becomes bright as a whole compared to the respective original frame images. It is noted that the value of all the added luminance signals is adjusted so as not to exceed a predetermined maximum value.

If the present set composition method is "Average" (Yes in step B14), the CPU 41 obtains a plurality of luminance signals, each representing luminance of a respective one of q (rows)×r (columns) pixels of a prospective composite image and produced by averaging luminance signals representing respective luminance of p pixels of the p read frame images which correspond in row and column to that pixel of the prospective composite image, and then producing a composite image by using the obtained plurality of luminance signals for respective pixels of the composite image, and develops the composite image on the VRAM 34 (step B15). Since in this case the luminance signals representing respective luminance of the pixels corresponding in row and column are averaged, changes in the luminance of the composite image over the composite signal are reduced as a whole compared to the respective original frame images.

If the present set composition method is "Maximum" (Yes in step B16), the CPU 41 obtains a plurality of luminance signals, each representing luminance of a respective one of q (rows)×r (columns) pixels of a prospective composite image and comprising a luminance signal representing maximum luminance selected by comparison from luminance signals of p pixels of the p read frame images which correspond in row and column to that pixel of the prospective composite image (steps B17, B18) and then producing a composite image by using the obtained plurality of luminance signals for respective pixels of the composite image, and develops the composite image on the VRAM 34. Since in this case the obtained luminance signals represent respective high luminance, the luminance of the whole composite image is increased compared to the original frame images.

If the present set composition method is "Minimum" (Yes in step B19), the CPU 41 obtains a plurality of luminance signals, each representing luminance of a respective one of q (rows)×r (columns) pixels of a prospective composite image and comprising a luminance signal representing minimum luminance selected by comparison from luminance signals of p pixels of the p read frame images which correspond in row and column to that pixel of the prospective composite image (steps B20, B21) and then producing a composite image by using the obtained plurality of luminance signals for respective pixels of the composite image, and develops the composite image on the VRAM 34. Since in this case the obtained luminance signals represent respective low luminance, the luminance of the whole composite image is decreased compared to the original frame images.

Each of the read successive frame images picked up contains three R, G and B primary color matter. In addition to the luminance signals representing respective luminance of the pixels of the read successive images, the composition process can be performed on the read frame images with respect to each of the three R, G and B primary color matter. More particularly, if the composition method is the "Add", the CPU 41 obtains a plurality of color signals, each representing color matter of a respective one of q (rows)×r (columns) pixels of a prospective composite image for each of three primary colors R, G and B and produced by adding color signals representing respective color matter of p pixels of the p read frame images which correspond in row and column to that pixel of the prospective composite image and then producing a composite image by using the obtained plurality of color signals for respective pixels of the composite image, and develops the composite image on the VRAM 34. If the composition method is the "Average", the CPU 41 obtains a plurality of color signals, each representing color matter of a respective one of q (rows)×r (columns) pixels of a prospective composite image for each of three primary colors R, G and B and produced by averaging color signals representing respective color matter of p pixels of the p read frame images which correspond in row and column to that pixel of the prospective composite image and then producing a composite image by using the obtained plurality of color signals for respective pixels of the composite image, and develops the composite image on the VRAM 34. If the composition method is the "Maximum", the CPU 41 obtains a plurality of maximum values of color signals, each representing color matter of a respective one of q (rows)×r (columns) pixels of a prospective composite image for each of three primary colors R, G and B, each maximum value being selected by comparison from the values of color signals representing p pixels of the p read frame images which correspond in row and column to that pixel of the prospective composite image and then producing a composite image by using the obtained plurality of maximum values of color signals for respective pixels of the composite image, and develops the composite image on the VRAM 34. If the composition method is the "Minimum", the CPU 41 obtains a plurality of minimum values of color signals, each representing color matter of a respective one of q (rows)×r (columns) pixels of a prospective composite image for each of three primary colors R, G and B, each minimum value being selected by comparison from the values of color signals representing p pixels of the p read frame images which correspond in row and column to that pixel of the prospective composite image and then producing a composite image by using the obtained plurality of minimum values of color signals for respective pixels of the composite image, and develops the composite image on the VRAM 34.

A hue of the composite image would change in the composition method for only such R, G and B. Thus, for example in the "Maximum" method, a composition method may be employed in which a pixel of the highest luminance is selected from among those of pixels of the read frame images which correspond in row and column and the luminance and color of that pixel are determined as being used for a corresponding pixel of a prospective composition image. Conversely, in the "Minimum" method a composition method may be employed in which a pixel of the lowest luminance is selected from among those of pixels of the read frame images which correspond in row and column, and the luminance and color of that pixel are determined as being used for a corresponding pixel of a prospective composition image.

In the addition of the color signals and the calculation of the average value, a vector addition or a scalar component addition may be employed.

The composite image thus produced is delivered via the VRAM controller 33 to the display unit 14 and then displayed on the composition result display part 67 of the composing picture 61 (step A24). The user can visually confirm what composite image was produced on the composition result display part 67. In addition, the user can change the composition range (between the composition start and end positions Smix and Emix) and the composition method ("Add", "Average", "Maximum" or "Minimum"), thereby obtaining various composition images easily.

When the user depresses the enter button 68 on the composing picture 61 in a state in which a satisfactory composite image is displayed (Yes in step A25), the CPU 41 records the presently displayed composite image in the flash memory 38 as the recording memory (step A26).

As described above, according to the first embodiment n frame images are picked up in the successive image-pickup mode, any number of successive frame pictures is selected from the n frame images picked up, and an optimal composition method is specified depending on the image pickup conditions of the object at that time, thereby producing a desired composite image easily. In that case, the user can visually confirm a resulting composite image on the picture 61 and thus store only necessary composite images efficiently in the memory.

When frame images are picked up by setting the time interval, Δt, between adjacent frame images to a sufficiently small value, a composite image such as would be obtained at a different shutter speed is obtained by changing the number of frame images to be combined. More particularly, if the range between the points 62a and 62b is increased on the bar 62d of the range selector 62 of FIG. 7 so as to increase the number of frame images to be combined, a composite image such as would be obtained at a reduced shutter speed is obtained. Conversely, if the range between the points 62a and 62b is reduced on the bar 62d so as to decrease the number of frame images to be combined, a composite image such as would be obtained at an increased shutter speed is obtained. If the Δt is increased, a composite image such as would be obtained by combining discrete frame images is obtained.

SECOND EMBODIMENT

While in the first embodiment a composite image was illustrated as being composed of the whole frame images in the composition process, in the second embodiment a composite image comprises combined corresponding image parts or areas of the frame images in the composition process.

Figure 11:
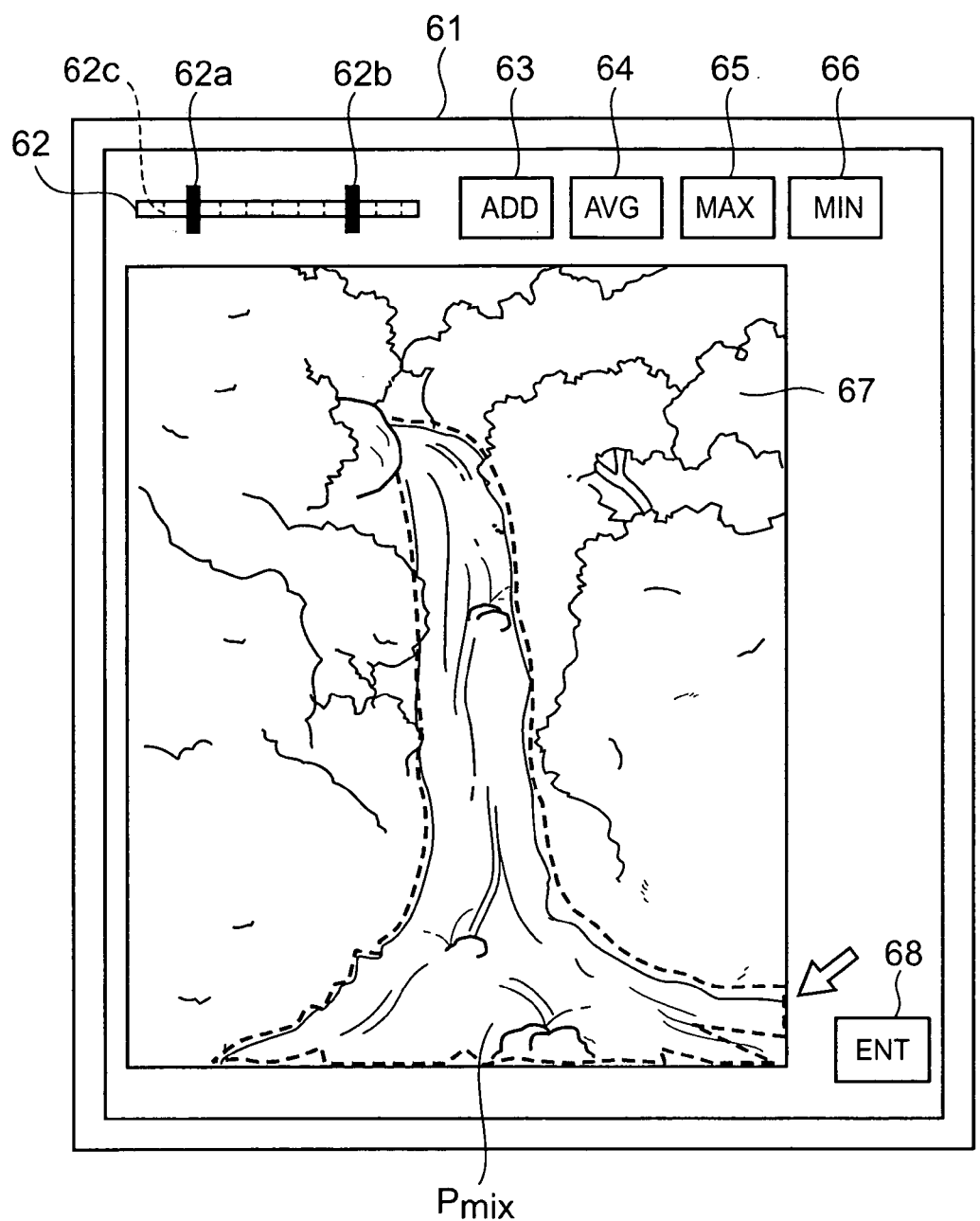
FIG. 11 illustrates a composing picture displayed on the digital camera in a second embodiment of the digital camera.

FIG. 11 illustrates a composing picture 61 on the digital camera 1 in the second embodiment. The basic structure of the composing picture 61 is similar to that of FIG. 7. That is, the composing picture 61 comprises a range selector 62 that specifies a composition range by moving on its bar 62d pointers 62a and 62b that represent composition start and end positions Smix and Emix, respectively; MIX buttons 63-66 that select image composition methods "Add", "Average", "Maximum" and "Minimum", respectively; a composition result display part 67 that displays a composition result; and an enter button 68 that gives an enter command.

By operation of these elements, a resulting composite image is displayed on a composition result display part 67. The displayed composite image is then recorded in a predetermined memory (flash memory 38) by depressing the enter button 68.

In the second embodiment, a part of an image (in the initial picture, a first frame image) displayed on the composition result display part 67 and to be combined with corresponding parts of other frame images can be specified, for example, with a pen on the touch panel 15. Pmix in FIG. 11 denotes that specified part or area (representing "flowing cascade").

As in the first embodiment, a successive image-pickup time interval, Δt, can be specified on the successive image-pickup interval setting picture 51 of FIG. 5. In this case, parts of the respective frame images obtained at intervals, Δt, corresponding to the specified area Pmix are combined. Information on the specified area Pmix is stored along with information on the composition operation in the RAM 43 of FIG. 3.

Operation of the second embodiment will be described next.

Figure 12:
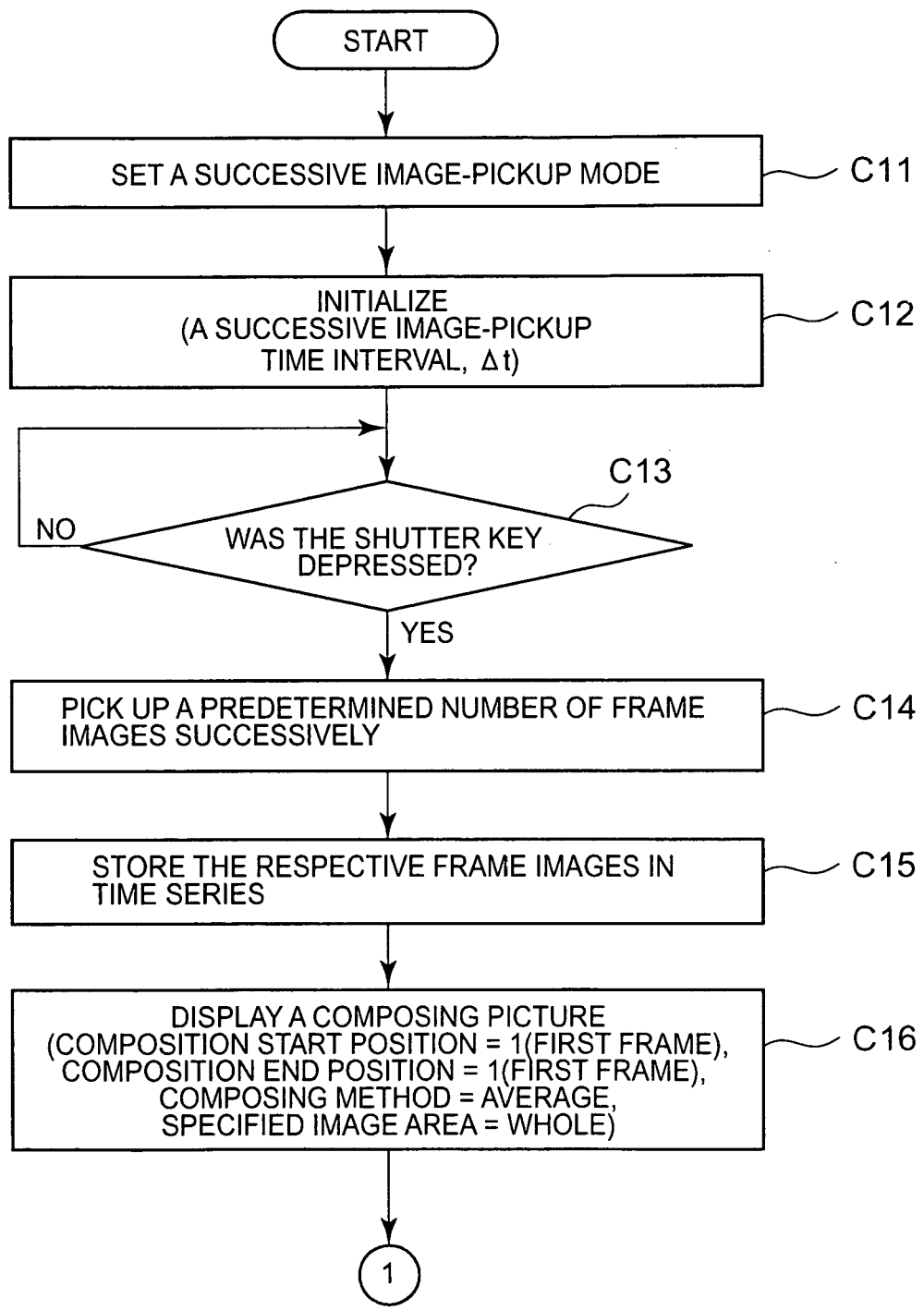
FIG. 12 is a flowchart indicative of processing of the digital camera in the second embodiment.
Figure 13:
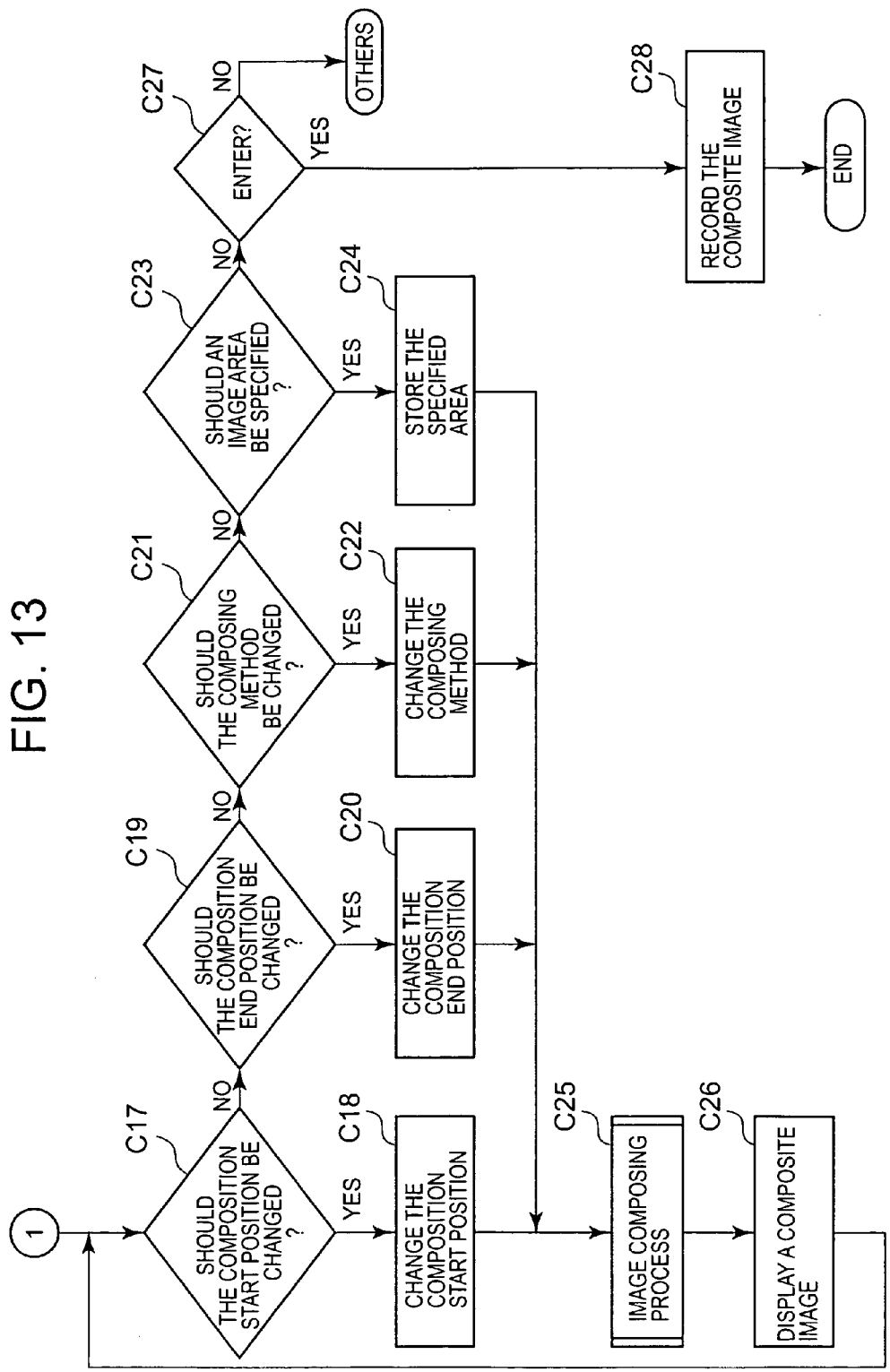
FIG. 13 is a flowchart continued to that of FIG. 12.

FIGS. 12 and 13 cooperate to compose a flowchart indicative of the operation of the digital camera 1 in the second embodiment. The respective processes shown by this flowchart are performed by the CPU 41 that composes the controller 32 in accordance with programs stored in the ROM 42.

When the user sets the successive image-pickup mode as in the first embodiment (step C11), a successive image-pickup interval setting picture 51 such as is shown in FIG. 5 is displayed initially. Any particular successive image-pickup time interval, Δt, can be set on the successive image-pickup interval setting picture 51 and stored in a predetermined area of the RAM 43 of FIG. 3 (step C12).

When the shutter key 7 is depressed (Yes in step C13), the CPU 41 performs a successive image-pickup operation at the set time intervals, Δt, thereby obtaining a predetermined number of (n) frame images (step C14). At this time, the n frame images obtained in this successive image-pickup mode are temporarily stored in time series in a predetermined area of the DRAM 31 as the buffer memory (step C15).

Then, the CPU 41 displays on the display unit 14 a composing picture 61 such as shown in FIG. 7 and waits for the user's command to be given next (step C16). In an initial state, each of the composition start and end positions Smix and Emix is set, for example, in a first frame image, and the composition method is set to the "Average". The specified image part or area Pmix is a whole image.

When the user moves the pointer 62a of the range selector 62 on its bar 62d on this composing picture 61 to any specified position, this position determines a composition start position Smix (steps C17, C18). Likewise, when the pointer 62b is moved on the bar 62d to any specified position, this position determines a composition end position Emix (steps C19, C20). Thus, a composition range in which successive frame images fall is determined. When any one of the MIX buttons 63-66 is selected, a composition method is determined depending on the selected button (steps C21, C22).

Further, when the user specifies any part of the image Pmix, for example, by tracing the configuration of that part with a pen (step C23), information on the specified part Pmix is stored in the RAM 43 and displayed on the display unit (step C24).

In accordance with such user's operation, the CPU 41 produces a composite image that comprises an image part composed of the same specified parts or areas of the frame images falling in the determined composition range in a composition method selected with a related one of the MIX buttons 63-66 (step C25). Except that the composition process is performed on the specified image part Pmix alone, the remaining process to be performed at this time is similar to that illustrated with reference to FIG. 10, and further descriptions thereof will be omitted.

The composite image thus produced is delivered via the VRAM controller 33 to the display unit 14 and then displayed on the composition result display part 67 of the composing picture 61 (step C26). The user can visually confirm the produced composite image on the composition result display part 67. In addition, the user can change the composition range (delimited the composition start and end positions Smix and Emix) and re-select the composition method ("Add", "Average", "Maximum" or "Minimum"), thereby obtaining various composition images easily.

It is possible to change the specified image part Pmix, thereby obtaining a composite image comprising changed combined image parts Pmix.

When the user depresses the enter button 68 on the composing picture 61 in a state in which the displayed composite image is satisfactory (Yes in step C27), the CPU 41 then records the presently displayed composite image in the flash memory 38 as the recording memory (step C28).

As described above, the second embodiment provides various composite images that can be obtained easily by combining only specified image parts of the frame images at different composition methods mentioned above, in addition to advantages similar to those produced by the first embodiment.

In addition, by changing the composition range with the range selector 62, a composite image such as would be obtained at a different shutter speed can be obtained. For example, with the "cascade" image of FIG. 11, an image part representing the flowing cascade (Pmix) can be specified. In this case, the respective frame images are combined with reference to only the specified image part, thereby producing a composite image on the composition result display part 67. The other part of the composite image excluding the specified area Pmix comprises a corresponding one of the first frame image displayed when the image part Pmix was specified. That is, the specified part of the composite image is composed of the respective successive flowing-cascade image portions and the background part of the composite image is composed of that of the first frame image.

As in the first embodiment, if the composition range is changed with the range selector 62 so as to increase the number of frame images to be combined, a resulting composite image comprises an image part representing a flowing cascade such as would be obtained at a reduced shutter speed. If the composition range is changed so as to decrease the number of frame images to be combined, a resulting composite image comprises an image part representing a still cascade such as would be obtained at an increased shutter speed. That is, according to the present invention, a resulting composite image can comprise image parts such as would be obtained at the respective different shutter speeds.

As described above, in the pickup of images of a moving object a composite image comprising image parts such as would be obtained at the respective different shutter speeds can be obtained after the frame images were picked up even when an optimal shutter speed is not set first to a move of the object.

While in the second embodiment the specified image parts Pmix (in FIG. 11, the flowing-cascade image parts) were illustrated as being combined, the image parts other than the specified areas Pmix may be combined without combining the image parts Pmix for producing a different composite image.

While in the respective embodiments the digital camera is handled as an example, the present invention is applicable to any other electronic devices with a camera function such as, for example, a cellular phone with a camera.

While in the respective embodiments the user's operations are illustrated as being performed by inputting various data at the key-in unit, the composition start and end position specifying pointers 62a and 62b may be operated, for example, on a touch panel without relying upon the cross key unit 10. Alternatively, if a pointing device such as a mouse is connectable to the digital camera of this invention, it may operate the digital camera. In addition, for example, a personal computer may be connected to the inventive digital camera to operate the digital camera indirectly with an input device thereof Specifying image parts of the frame images to be combined in the second embodiment may be performed likewise with the pointing device or the input device of the personal computer.

Only one of the composition start and end positions described in the above embodiments may be changeable. The composition method may be fixed to that determined beforehand for the digital camera to be used.

While in the respective embodiments the successive image-pickup time interval, Δt, on a picture such as shown in FIG. 5 is illustrated as being set when the successive image-pickup mode is set by the user, such setting is not necessarily required each time the successive image-pickup mode is set. For example, it may be, of course, performed on a picture such as shown in FIG. 5 in another set mode.

Alternatively, it may be arranged that without performing the successive image pickup at the time interval, Δt, specified by the user, the successive image pickup is set so as to be performed always at high speeds. When Δt is then specified by the user, the respective frame images picked up may be thinned in accordance with the specified Δt, thereby adjusting the time interval between the respective frame pictures to be combined. By doing so, the time interval between the respective picked-up frame images can be changed later, various composite images can be obtained by a single image-pickup operation, and the number of mistakes in the image pickup due to incomplete setting is further reduced.

The methods of the present invention described with reference to the two embodiments can be written as programs, for example, to recording mediums such as magnetic discs (flexible discs, hardware discs, etc.), optical discs (CD-ROMs, DVDs, etc.), and semiconductor memories to cause computers to read and perform the programs such that they can be used in various devices/apparatus. Alternatively, such programs may be received via transmission mediums such as networks for use in various devices/apparatus. Computers that implement the inventive apparatus read the programs recorded on recording mediums or obtained via transmission mediums and performs the above-mentioned processes in accordance with the programs.

The present invention can be implemented using various large-capacity recording mediums such as next generation optical discs using blue color lasers that comprise blue-ray discs (R) and AODs (Advanced Optical Discs), HD-DVDs "9" using read color lasers, and blue laser DVDs using bluish-purple color lasers, in addition to the recording mediums that comprise the CD-ROMs and DVD-ROMs which will be developed in the future.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2003-312524 filed on Sep. 4, 2004 and each including specification, claims, drawings and summary. The disclosure of the above Japanese patent application is incorporated herein by reference in its entirety.

What is claimed is:

1. An image pickup apparatus comprising:
an image pickup unit that picks up successive frame images of an object at predetermined time intervals;
a storage device that stores in time series a predetermined number of successive ones of the frame images picked up by the image pickup unit;
a composition range specifying unit that specifies a composition start position and a composition end position on the predetermined number of successive image frames to thereby delimit a time range in which successive ones of the predetermined number of successive image frames fall;
an image part specifying unit which is operable by a user to specify at least one same part of the frame images to define an area range;
a combining unit that reads from the storage device the respective successive frame images falling in the delimited time range, and combines the read frame images with respect to only the specified at least one same part in the defined area range, thereby producing a composite image;
a display unit that displays the composite image;
a control unit, responsive to an enter command, for recording the composite image displayed on the display unit in a predetermined memory;
a composition range changing unit for changing the time range by changing at least one of the specified composition start position and the specified composition end position;
a combining control unit that controls the combining unit so as to read from the storage device the respective successive frame images falling in the changed time range, and combines the read frame images with respect to only the specified at least one same part in the defined area range, thereby producing an updated composite image when the composition range is changed;
wherein the display unit displays the updated composite image when the composition range is changed; and
wherein the control unit, responsive to the enter command, records the updated composite image displayed on the display unit in the predetermined memory when the time range is changed.

2. The image pickup apparatus of claim 1, wherein the composition range specifying unit comprises a range selector having a bar with a length for specifying the predetermined number of successive image frames on the bar on a time basis and specifying the composition start and end positions on the bar.

3. The image pickup apparatus of claim 1, further comprising:
a selecting unit that selects one of a plurality of composition methods; and
wherein the combining unit combines the read successive frame images into the composite image in the composition method selected by the selecting unit.

4. The image pickup apparatus of claim 3, wherein the selected composition method comprises obtaining a plurality of luminance signals, each representing luminance of a respective one of pixels of a prospective composite image and produced by adding luminance signals representing respective luminance of pixels of the read frame images which correspond in row and column to the pixel of the prospective composite image and then producing a composite image by using the obtained plurality of luminance signals for respective pixels of the composite image.

5. The image pickup apparatus of claim 3, wherein the selected composition method comprises obtaining a plurality of luminance signals, each representing luminance of a respective one of pixels of a prospective composite image and produced by averaging luminance signals representing respective luminance of pixels of the read frame images which correspond in row and column to the pixel of the prospective composite image and then producing a composite image by using the obtained plurality of luminance signals for respective pixels of the composite image.

6. The image pickup apparatus of claim 3, wherein the selected composition method comprises obtaining a plurality of luminance signals, each representing luminance of a respective one of pixels of a prospective composite image and produced by selecting a luminance signal representing maximum luminance from luminance signals representing respective luminance of pixels of the read frame images which correspond in row and column to the pixel of the prospective composite image and then producing a composite image by using the obtained plurality of luminance signals for respective pixels of the composite image.

7. The image pickup apparatus of claim 3, wherein the selected composition method comprises obtaining a plurality of luminance signals, each representing luminance of a respective one of pixels of a prospective composite image and produced by selecting a luminance signal representing minimum luminance from luminance signals representing respective luminance of pixels of the read frame images which correspond in row and column to the pixel of the prospective composite image and then producing a composite image by using the obtained plurality of luminance signals for respective pixels of the composite image.

8. The image pickup apparatus of claim 1, further comprising a successive image-pickup time interval setting unit that sets the time intervals at which the image pickup unit picks up the successive frame images.

9. An image processing method comprising:
   picking up successive frame images of an object at predetermined time intervals;
   storing a buffer memory in time series a predetermined number of successive ones of the frame images picked up;
   specifying a composition start position and a composition end position on the predetermined number of successive image frames to thereby delimit a time range in which successive ones of the predetermined number of successive image frames fall;
   specifying, in accordance with an instruction input by a user, at least one same part of the frame images to define an area range;
   reading from the buffer memory the respective successive frame images falling in the delimited time range, and combining the read frame images only with respect to the specified at least one same part in the defined area range, thereby producing a composite image;
   displaying the composite image on a display screen;
   responsive to an enter command, recording the composite image displayed on the display screen in a predetermined memory;
   changing the time range by changing at least one of the specified composition start position and the specified composition end position;
   reading from the storage device the respective successive frame images falling in the changed time range, and combining the read frame images with respect to only the specified at least one same part in the defined area range, thereby producing an updated composite image when the composition range is changed;
   displaying the updated composite image on the display screen; and
   responsive to the enter command, recording the updated composite image displayed on the display screen in the predetermined memory.

10. A computer readable recording medium having stored thereon an image processing program for controlling an image pickup apparatus to perform functions of:
   picking up successive frame images of an object at predetermined time intervals;
   storing a buffer memory in time series a predetermined number of successive ones of the frame images picked up;
   specifying a composition start position and a composition end position on the predetermined number of successive image frames to thereby delimit a time range in which successive ones of the predetermined number of successive image frames fall;
   specifying, in accordance with an instruction input by a user, at least one same part of the frame images to define an area range;
   reading from the buffer memory the respective successive frame images falling in the delimited time range, and combining the read frame images only with respect to the specified at least one same part in the defined area range, thereby producing a composite image;
   displaying the composite image on a display screen;
   responsive to an enter command, recording the composite image displayed on the display screen in a predetermined memory;
   changing the time range by changing at least one of the specified composition start position and the specified composition end position;
   reading from the storage device the respective successive frame images falling in the changed range, and combining the read frame images with respect to only the specified at least one same part in the defined area range, thereby producing an updated composite image when the composition range is changed;
   displaying the updated composite image on the display screen; and
   responsive to the enter command, recording the updated composite image displayed on the display screen in the predetermined memory.

* * * * *